Oct. 6, 1925. 1,556,454
G. E. MOLYNEUX
SPEED AND POWER CONTROLLING MECHANISM FOR VEHICLES
Filed June 12, 1923
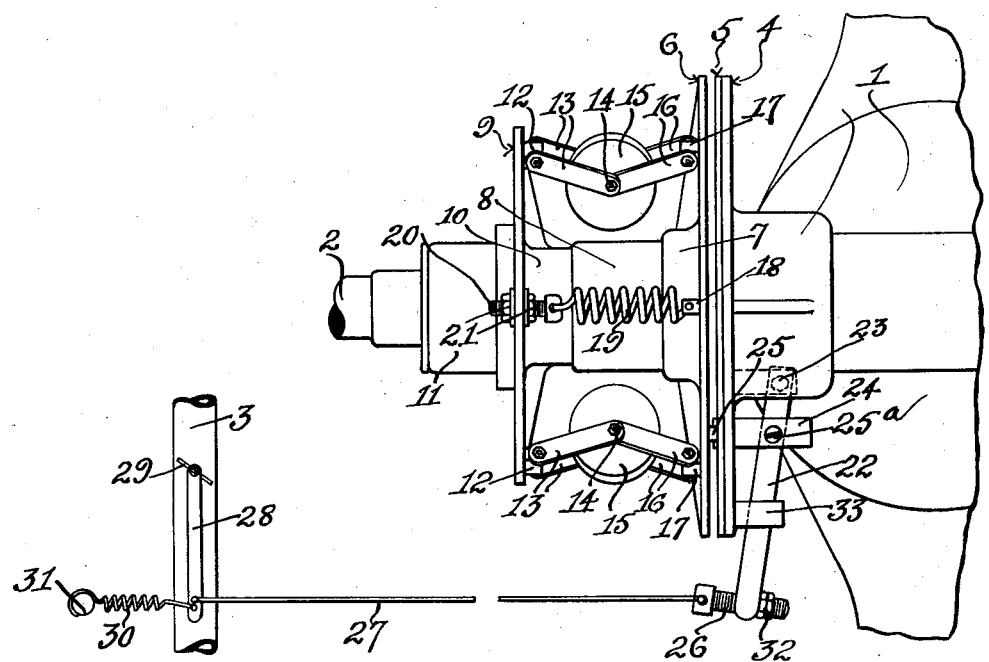
INVENTOR:
George E. Molyneux.
BY
Chas. McC. Chapman
ATTORNEY.

Patented Oct. 6, 1925.

1,556,454

UNITED STATES PATENT OFFICE.

GEORGE E. MOLYNEUX, OF BAYONNE, NEW JERSEY, ASSIGNOR OF ONE-HALF TO JOHN F. ALVORD, OF NEW YORK, N. Y.

SPEED AND POWER CONTROLLING MECHANISM FOR VEHICLES.

Application filed June 12, 1923. Serial No. 644,850.

*To all whom it may concern:*

Be it known that I, GEORGE E. MOLYNEUX, a citizen of the United States, residing in Bayonne, county of Hudson, and State of New Jersey, have invented a new and useful Improvement in Speed and Power Controlling Mechanism for Vehicles, of which the following is a description.

This invention has reference to mechanism for controlling the speed and power of automobiles, and particularly has reference to automatically operating brakes, controlled by the speed of the vehicle, and which in turn controls the engine, or the feed of fuel to the latter, thus controlling the power of the engine.

Among the objects of my invention may be noted the following: to provide a brake mechanism which will go into action automatically when the speed of the vehicle exceeds a predetermined maximum, and which brake mechanism will automatically control the feed of the fuel to the engine, thus controlling the speed of the vehicle and also the power of the engine; to provide an automatically operating brake adapted to be applied and released, according to predetermination, during a given speed of the vehicle, which brake is carried and actuated by the propeller or driving shaft of the engine or automobile; to provide a brake controlling mechanism carried by the driving or propeller shaft of a vehicle adapted to operate through the medium of the speed of the driving shaft or source of power and to automatically apply the brake to prevent the vehicle from exceeding a predetermined speed; to provide a controlling mechanism for automatically operated brakes adapted to be adjusted so as to cause the brake to be applied during the operation of the vehicle when variable predetermined speeds of the driving shaft or propeller shaft are exceeded; to provide an automatically operating brake-applying and brake-releasing mechanism adapted to go into action according to predetermination when a certain speed of the vehicle has been exceeded, so as to prevent excess of said speed and reduce the latter, without stopping the vehicle, and which brake mechanism, when so set in action, operates to check the power of the engine by checking the feed of fuel thereto, and then automatically release or go out of action and increase the feed of fuel to the engine, so as to enable the vehicle to continue at proper speed and under adequate power; to provide a brake controlling mechanism operated by centrifugal force and adapted to automatically go into and out of action during the drive of the motive power and the running of the vehicle, without actually stopping the latter, and which brake mechanism does not interfere with or curtail the power of the engine when required for making grades or for heavy loads; to provide an automatically operating brake, adapted to be operated according to predetermination, which allows the differential gearing, operating upon the rear axle, to be unaffected and which permits the said rear axle to have four or more times the speed of the driving shaft without being affected by the said brake mechanism; to provide an automatically operating brake, such as described, applied to the driving or propeller shaft, which provides for effective braking action under considerably less power than if the said brake were otherwise applied; to provide an automatically operating brake mechanism, which also effects control of the engine, of such form and simplicity of construction as to enable the entire mechanism to be inclosed within a casing which may be effectively sealed to prevent tampering with the same; to provide an automatically operating brake which will reduce excessive speed of a vehicle without so operating as to choke the engine by enabling, during the braking action, an excessive feed of gas or fuel to the engine; and to provide certain details of construction which are strong, durable, economical and effective for accomplishing the purposes set forth in the foregoing.

With the above objects in view and others which will be detailed during the course of this description, my invention consists in the parts, features, elements and combinations thereof hereinafter described and claimed.

In order that my invention may be clearly understood, I have provided drawings wherein:

The figure is an elevation of so much of a power driven vehicle as is deemed necessary to show the application and operation of my controlling mechanism, the figure showing such mechanism applied and in inactive position.

Primarily, it should be understood that the brake controlling mechanism disclosed herein is analogous to that disclosed in my joint application now pending, Serial Number 372,716, renewed February 2, 1923. It is well understood that heavy vehicles, such as trucks, mail wagons, etc., are frequently driven at dangerous speed far in excess of that allowed by law or city ordinances. At the present time, such vehicles are not provided with means for controlling the speed thereof or for cutting down the latter or applying the brakes without stopping the vehicle. Furthermore, heavy vehicles have no means by which coasting can be prevented, and dangerously high speed leading to accidents can be prevented, avoided or overcome. My invention is provided with a view to controlling the maximum speed at which a vehicle can run either under power or while coasting, thus preventing high or dangerous speeds being attained at any time, and placing a check not only upon the tendency of a car when coasting to speed up; but, also, upon reckless driving. My invention is also intended to provide for the control of the feed of fuel to the engine, so that the power of the engine may be controlled and also so that the engine may not be choked by the feed of fuel thereto when the speed of the vehicle is reduced.

Referring to the drawings, the numeral 1 indicates the gear-housing, or transverse casing, of the rear axle of a power driven vehicle, such as a truck or other heavy vehicle. The numeral 2 indicates the driving shaft of the vehicle, or the propeller shaft, which extends rearwardly into driving connection with the rear axle within the casing 1. The numeral 3 indicates the conduit for gas to the intake manifold, for example, of a hydrocarbon engine, or a portion of the conduit between the carbureter and the intake manifold of such an engine, it being understood that a hydrocarbon engine is referred to here merely as an example of a power means by which the driving or propeller shaft may be actuated, and reference thereto is not to be taken as a limitation.

The forward end of the casing 1 is provided, in any suitable manner, with a disk 4 of ample diameter constituting a stationary member of the brake mechanism, said member being provided with a suitable facing of asbestos fiber, or other friction-producing medium, adapted to increase the frictional drag between the stationary brake member 4 and the movable brake member 6, which latter is provided with a hub 7 mounted upon a sleeve 8 adapted to slide longitudinally on the shaft 2, and to rotate therewith. 9 is a disk also provided with a hub 10, which is fixed upon a collar 11 rigidly mounted upon the shaft 2 so as to have rotation therewith and no longitudinal movement thereon. The disk 9, on its rear surface, is provided with a plurality of ears 12, to which are pivoted the front ends of parallel links 13, the rear ends of which are pivotally mounted at 14 upon the journals of weights 15, which journals also have pivoted thereto the front ends of a pair of parallel links 16, the rear ends of which are pivotally mounted upon the ears 17 fixed to the movable brake member 6. Thus the weights 15 are mounted centrally of the compound links 13, 16 and there are as many weights thus mounted and carried by the brake mechanism as are deemed necessary to provide the weight, under centrifugal force, necessary to shift the movable brake disk 6 relatively to the fixed disk 4; or a lesser number of weights may be employed and their weight increased. The links and weights operate as a toggle by which to apply the brake member 6 with sufficient power to the brake member 4 to control and reduce the speed of the vehicle. A lug 18, on the disk 6, has one end of a spiral spring 19 hooked therein, the other end of which spring is hooked into the head of a screw 20 passing through the disk 9 and held adjustably by nuts 21 on opposite sides of said disk. As many of these springs may be employed as are deemed or found necessary to control the normal position of the brake member 6 properly separated from the brake member 4, and to aid the weights 15 in bringing about the separation of the brake disks automatically; and care should be taken, in gaging or in adjusting the tension of the springs, to avoid interference with the weights 15, or their centrifugal force, to properly control the action of the disk 6.

The weights 15 are predetermined to resist the revolution of the driving or propeller shaft 2 up to a certain number of revolutions per minute, indicative of a predetermined speed of the vehicle which it is desired shall not be exceeded. When said speed is exceeded, the weights will fly outwardly, under centrifugal force, thus causing the brake member 6 to be shifted automatically into engagement with the fixed brake member 4, the controlling weights throwing the links 13, 16 outwardly and producing a toggle action to drive the member 6 toward the member 4. The distance between the brake members 4 and 6 normally is gaged with reference to the extent of movement of the links 13, 16, to prevent the latter from reaching a dead center, indicated by a plane cutting the axis of the weights 15 and the axes around which the links 13, 16 swing. The weights will operate between the aforesaid plane and the sleeve 8, so that centrifugal force will simultaneously drive all the weights uniformly outwardly to thus bring the brake member 6 uniformly toward the brake member 4. The weights are interchangeable for others lighter or heavier, according to the desired maximum speed of the vehicle; and the adjustment of the tension of springs 19 can be regulated for a given weight of weights 15 to make the work of the latter harder or easier, with reference to the speed of the vehicle, in automatically applying the brake.

It will be readily seen and understood that the construction disclosed leaves the rear axle within the casing 1 entirely free, and puts the braking action on the driving or propeller shaft. Hence, differential gearing of any ratio desired can be used between the driving or propeller shaft and the rear axle, which ratio, for example, may give or produce four revolutions of the rear axle to one of the driving shaft. Hence, the power required to effect the braking action for controlling the speed of the vehicle is considerably less, or, with the ratio noted, approximately four times less, than if the speed of the rear axle and of the propeller shaft were the same. From the construction disclosed it will also been seen that the braking action is the direct result of the speed of the driving shaft; yet, under load or on grade, the power of the engine is not affected and the automatic action of the brake is not necessarily effected.

In order to control the power of the engine, or the feed of fuel thereto, I have provided a simple device between the intake of the engine and the speed controlling brake. This device, for example, consists of a lever 22 of the third order fulcrumed at 23 to a suitable portion of the casing 1 adjacent the back of the fixed disk 4, the latter being apertured or slotted for the passage of the forward end of an arm 24, said forward end being provided with an anti-frictional roll 25 adapted to bear upon the inner surface of the brake disk 6. The arm 24 is preferably fixed at 25$^a$ to the lever 22, since the latter is given but a very small movement. At its outer end, the lever 22 carries an adjustable screw 26, through the head of which is passed a wire or rod 27, the forward end of which engages a lever 28 adapted to operate the butterfly valve or throttle 29 located in the fuel conduit 3 and thus control the feed of gas or passage of gas through said conduit. The throttle lever 28 is held in a normal position by means of a spiral spring 30 hooked thereinto near its outer end, the other end of which spring is secured to a fixture 31 on any adjacent part of the engine or car. The screw 26 may be adjusted and held by nuts 32, and the lever 22 may pass through a slotted lug 33 extending from the back of the disk 4. By this construction it will be seen that, when the brake disk 6 goes into action, it will act upon the anti-frictional roll 25 to push the arm 24 rearwardly, which will likewise shift the lever 22 rearwardly, thus shifting the rod 27 rearwardly longitudinally, which in turn will shift the throttle lever 28, turning the butterfly valve in the conduit 3, and thus either shutting off or reducing the feed of gas to an extent such as to prevent choking the engine when the brake is applied to reduce the speed of the vehicle.

While I have illustrated an automatic means, mechanical in character, for throttling, or controlling the feed of fuel to, the engine when the controlling brake is applied, I desire it understood that I may use various other throttling means such, for example, as electro-magnetically controlled means or devices for shutting off the gas or throttling the engine. With such means, I may completely seal the brake mechanism by inclosing the same in a casing so as to prevent tampering with the brake mechanism. In other words, it may be found necessary under the law to inclose the controlling brake mechanism in such manner that, after an adjustment is made for a predetermined speed of the vehicle, adjustment cannot be altered. This could only be done by inclosing the controlling mechanism and sealing the same by authority. When thus sealed, it may be made a penal offence to break the seal and, in consequence, the controlling mechanism cannot and will not be tampered with, regardless of how the same may be normally set with reference to the speed of the vehicle.

On the other hand, it will be understood that I have provided a very effective means, for controlling and reducing the speed of a vehicle to maximum, which is applied to the driving or propeller shaft, and which does not affect the differential between the propeller shaft and the rear axle of the vehicle. Also, that I have provided means for throttling the engine when the brake is applied, which prevents the engine from choking by feed of too much gas thereto when the speed of the vehicle is reduced, and which means or mechanism does not, however, affect the engine when its power is required for load or grade.

Having thus described my invention, what I claim and desire to secure by Letters Patent is:

1. In combination with the driving shaft of a power driven vehicle, and power means for actuating said shaft, a brake mechanism mounted on said shaft, including means for automatically operating said brake mechanism, and means for throttling the power means when the brake mechanism goes into action.

2. In combination with the driving shaft of a power driven vehicle and power means for actuating said shaft, a brake mechanism mounted on a shaft, including means for automatically operating said brake mechanism, and means for throttling the power means while the brake is controlling the speed of the vehicle.

3. In combination with the driving shaft of a power driven vehicle, and power means for actuating said shaft, a brake mechanism mounted on said shaft, including means for automatically operating said brake mechanism, and means for automatically cutting off the feed of fuel to the engine when the brake goes into action.

4. In combination with the driving shaft of a power driven vehicle, and power means for actuating said shaft, a brake mechanism including means for controlling the speed of the vehicle without stopping the same, and means for controlling the feed of fuel to the engine during the action of the brake mechanism.

5. In combination with the driving shaft of a power driven vehicle, and power means for actuating the said shaft, including a conduit through which gas is fed to the engine, a brake mechanism mounted on said shaft including means for actuating said brake mechanism, and a mechanical connection between the brake and conduit whereby, when the brake goes into action, the supply of fuel through the conduit will be controlled.

6. In combination with the driving shaft of a power driven vehicle, and power means for actuating the said shaft, including a conduit through which gas is fed to the engine, a brake mechanism mounted on said shaft including means for automatically actuating said brake mechanism, and a mechanical connection between the brake and conduit whereby, when the brake goes into action, the supply of fuel through the conduit will be controlled.

7. In combination with the brake mechanism of a power driven vehicle and a conduit through which the gas is fed to the engine, a mechanical connection between the brake and the conduit whereby, when the brake goes into action, the supply of fuel through the conduit will be controlled, consisting of a lever actuated by the brake, and means actuated by the lever to control the feed of gas through the conduit.

8. In combination with a brake mechanism for vehicles and a conduit through which to feed fuel to an engine, means for controlling the feed of fuel through the conduit comprising a valve, a lever, connections between the valve and lever, and means whereby the brake may actuate the lever.

9. A motor vehicle having means for driving the same at any or at indefinite speed; a normally unset brake mechanism for said vehicle mounted on the driving or propeller shaft, including means for setting the brake when the speed of the shaft attains a predetermined maximum to reduce the speed of the vehicle without stopping the same.

10. A motor vehicle having means for driving the same at any or at indefinite speed; a normally unset brake mechanism mounted on the driving or propeller shaft, including means for setting the brake mechanism in action under control of the said shaft to reduce the speed of the vehicle without stopping the latter.

11. A motor vehicle having means for driving the same at any or at indefinite speed; a normally unset brake mechanism for said vehicle applied to the driving or propeller shaft, including toggle mechanism operating directly upon a part of the brake mechanism for setting the brake when the speed of the vehicle attains a predetermined maximum to reduce the speed of the vehicle without stopping the same.

12. A motor vehicle having means for driving the same at any or at indefinite speed; a normally unset brake mechanism mounted on the driving or propeller shaft, including toggle mechanism operating directly upon a part of the brake mechanism for setting the brake, when the speed of the vehicle attains a predetermined maximum, to reduce the speed of the vehicle without stopping the same.

13. A motor vehicle including a driving or propeller shaft and a driven shaft; transmission means between the two shafts; a normally unset brake mechanism mounted on the driving shaft, including means for setting the brake mechanism when the speed of the vehicle attains a predetermined maximum, to reduce the speed of the vehicle without stopping the same and without curtailing the power of the engine.

14. A brake mechanism for vehicles comprising two members, one of which is fixed and the other of which is carried by the driving or propeller shaft of the vehicle, and including interacting means whereby the movable member will be driven into engagement with the fixed member, when the vehicle has attained a predetermined speed, to reduce said speed, and will disengage said fixed member when the speed of the vehicle has been reduced as predetermined.

15. A motor vehicle having means for driving the same; a brake mechanism comprising a fixed member and a member carried by the driving or propeller shaft of the vehicle; spring means normally controlling the position of the member on the driving shaft to hold it disengaged from the fixed member; and means for driving the movable member against the fixed member, when the vehicle has attained a predetermined speed, to reduce said speed without stopping the vehicle.

16. A motor vehicle having means for normally driving the same at any or at indefinite speed; a normally unset brake mechanism for controlling the speed of the vehicle regardless of the speed of the driving means comprising a movable member carried by the driving shaft of the vehicle, and including automatic means operating on the brake mechanism to cause the latter to go into action when the speed of the vehicle exceeds a predetermined maximum, and operate to reduce the speed of the vehicle.

17. A motor vehicle having means for driving the same at any or at indefinite speed; in combination with a normally unset brake mechanism for controlling the speed of the vehicle regardless of the speed of the driving means, including a fixed member and a member carried by the driving shaft of the vehicle, and including means which automatically operates upon the movable member, when the speed of the vehicle exceeds a predetermined maximum, to reduce the speed of the vehicle.

18. A motor vehicle having means for driving the same at any or at indefinite speed; a normally unset brake mechanism for controlling the speed of the vehicle regardless of the speed of the motor, including a fixed brake member and a brake member carried by the driving shaft of the vehicle, and including means to act upon the movable brake member to reduce the speed of the vehicle to a predetermined rate when that rate is exceeded due to the driving means.

19. A motor vehicle having means for driving the same at any or at indefinite speed; a normally unset brake mechanism adapted to reduce and control the speed of the vehicle above a predetermined maximum regardless of the speed of the motor, said brake mechanism including a rotating and reciprocating member carried by the driving shaft of the vehicle; and means for applying friction to said member controlled by centrifugal force.

20. In combination with the driving and driven shafts of a vehicle, gearing between the two shafts; a casing inclosing the gearing and driven shaft; a fixed brake member mounted on the casing; a movable brake member mounted on the driving shaft in cooperative relation to the other brake member and normally out of engagement therewith; and means controlled by the speed of the driving shaft for shifting the movable member into engagement with the fixed member.

21. In combination with the driving and driven shafts of a vehicle, gearing between the two shafts; a casing inclosing the gearing and driven shaft; a fixed brake member mounted on the casing; a movable brake member mounted on the driving shaft in cooperative relation to the other brake member and normally out of engagement therewith; and means acting on the movable brake member controlled by centrifugal force to shift said member into engagement with the fixed member.

22. A motor vehicle having means for driving the same at any or at indefinite speed; a brake mechanism comprising a fixed member; a movable brake member; and springs for normally holding the same separated from the fixed member; and means for driving the movable member against the fixed member in opposition to the tension of the springs when the speed of the vehicle exceeds a predetermined maximum.

23. A motor vehicle having means for driving the same at any or at indefinite speed; a brake mechanism comprising a fixed member; a movable brake member; and springs for normally separating the same from the fixed member; means for adjusting the tension of the springs; and means for driving the movable member against the fixed member when the speed of the vehicle exceeds a predetermined maximum in opposition to the tension of the springs, comprising a plurality of devices operable by centrifugal force.

24. A motor vehicle having means for driving the same at any or at indefinite speed; a brake mechanism comprising a fixed member and a movable member mounted on the driving shaft of the vehicle; means for holding said members apart under predetermined power; and means for automatically shifting the movable member in engagement with the fixed member in opposition to the power means when the speed of the vehicle exceeds a predetermined maximum.

25. In combination wth a power driven vehicle, and a casing for the rear axle thereof, a brake mechanism mounted in part on the casing and in part on the driving shaft of the vehicle, and means for operating the brake mechanism and controlling the speed of the vehicle.

26. In combination with the driving shaft of a vehicle, a stationary brake member; a movable brake member carried by the driving shaft; and toggle mechanism mounted on and for shifting the movable brake member into engagement with the stationary member.

27. In combination with the driving shaft of a vehicle, a stationary brake member; a movable brake member mounted on the driving shaft; and toggle mechanism weighted at its joint mounted on and for shifting the movable brake member into engagement with the stationary member.

28. In combination with the driving shaft of a vehicle, a stationary brake member; a movable brake member mounted on the driving shaft; and toggle mechanism controlled by the speed of the driving shaft mounted on and to actuate said movable member.

29. In combination with the driving shaft of a vehicle, a casing in which the shaft is journaled; a brake disk fixed to the casing; a brake disk mounted upon the shaft; springs for normally keeping the brake disks separated; and means acting by centrifugal force under the speed of the driving shaft for forcing the brake disks together against the power of the springs.

30. In combination with the driving shaft of a vehicle, a casing in which the shaft is journaled; a brake disk fixed to the casing; brake mechanism mounted upon the shaft and capable of rotating therewith and reciprocating thereon, said brake mechanism consisting of a disk to engage the fixed disk; and toggle mechanism to actuate the movable disk.

31. In combination with the driving shaft of a vehicle, a casing in which the shaft is journaled; a brake disk fixed to the casing; and a brake mechanism mounted upon the shaft and adapted to rotate therewith and reciprocate thereon including a disk to engage the fixed disk; springs for normally keeping the disks apart; toggle mechanism for shifting the movable disk; and means for adjusting the tension of the springs.

32. In combination with the driving shaft of a vehicle, a casing in which the shaft is journaled; a brake disk fixed to the casing; and a brake mechanism mounted upon the driving shaft consisting of a disk mounted to rotate therewith, a disk mounted to rotate therewith and reciprocate thereon, springs between the two disks for controlling the position of the movable disk; and toggle mechanism between the two disks for shifting the movable disk.

33. A motor vehicle having, in combination, a friction brake including a pair of friction disks, means for causing the disks to engage one another, a conduit through which fuel is fed to the motor, a valve in the conduit, and means connecting the movable disk with the valve whereby, when the brake is applied, the valve is operated to control the passage in the conduit.

34. A motor vehicle having, in combination, a friction brake, including a fixed and a movable member; means for causing the members to engage one another; a conduit through which fuel is fed to the motor; a valve in the conduit; and means connecting the movable member with the valve whereby, when the brake is applied, the valve is operated to control the passage in the conduit.

GEORGE E. MOLYNEUX.